(12) United States Patent
Sasanecki

(10) Patent No.: US 11,885,868 B2
(45) Date of Patent: Jan. 30, 2024

(54) PALLET SAFETY SYSTEM

(71) Applicant: Tallmadge Spinning & Metal Co., Tallmadge, OH (US)

(72) Inventor: Jacob M. Sasanecki, Uniontown, OH (US)

( * ) Notice: Subject to any disclaimer, the term of this patent is extended or adjusted under 35 U.S.C. 154(b) by 676 days.

(21) Appl. No.: 16/408,779

(22) Filed: May 10, 2019

(65) Prior Publication Data
US 2020/0355813 A1 Nov. 12, 2020

(51) Int. Cl.
| | |
|---|---|
| *G01S 13/04* | (2006.01) |
| *G01S 15/04* | (2006.01) |
| *G01S 17/00* | (2020.01) |
| *G01S 13/00* | (2006.01) |
| *G01S 15/00* | (2020.01) |
| *G01S 17/04* | (2020.01) |

(52) U.S. Cl.
CPC ............ *G01S 13/04* (2013.01); *G01S 13/003* (2013.01); *G01S 15/003* (2013.01); *G01S 15/04* (2013.01); *G01S 17/003* (2013.01); *G01S 17/04* (2020.01)

(58) Field of Classification Search
CPC ........................ B65G 65/23; B65G 2201/0258; B65G 57/24; B65G 61/00; B65G 1/00; B65G 65/00; B65G 69/22; B65G 67/60; B65G 35/06; B65G 1/0492; B65G 1/1373; B65G 1/06; B65G 19/02; B65G 15/00; B65G 59/02; B65G 1/137; B65G 1/065; B65G 2203/042; B65G 1/04; B65G 43/08; B65G 21/2054; B65G 39/18; B65G 63/004; B65G 1/10; B65G 2207/30; B65G 2209/04; B65G 1/0464; G01V 8/20; G01V 8/12; G01V 8/10; G01S 17/06; G01S 13/003; G01S 13/04; G01S 15/04; G01S 17/04; G01S 15/003; G06Q 10/08; G06Q 10/06; G06Q 50/28; B65D 2519/00815; B23P 19/041

See application file for complete search history.

(56) References Cited

U.S. PATENT DOCUMENTS

| | | | | |
|---|---|---|---|---|
| 4,214,848 | A * | 7/1980 | Verwey | B65G 57/245 198/475.1 |
| 6,193,048 | B1 * | 2/2001 | Keith | B23Q 7/1431 198/465.1 |
| 6,371,720 | B1 * | 4/2002 | Ouellette | B65G 57/005 414/791.6 |
| 7,547,182 | B2 * | 6/2009 | Hogue | B65G 57/18 414/789.5 |
| 2002/0130817 | A1 * | 9/2002 | Forster | G01S 13/765 343/770 |

(Continued)

FOREIGN PATENT DOCUMENTS

DE 102006002356 A1 * 8/2006 ............ B65H 43/00

*Primary Examiner* — Olumide Ajibade Akonai
(74) *Attorney, Agent, or Firm* — Timothy A. Hodgkiss

(57) ABSTRACT

A pallet safety system includes one or more of a pallet bed monitoring system, a pallet height monitoring system, and a pallet interface monitoring system, each of which provide an emitter and a detector. The safety system may be configured to be retrofit to an existing pallet system and is enabled to monitor the presence of unwanted obstructions at various regions proximate to the pallet bed opening, including a plane region above and parallel to the pallet beds, a region proximate to an interface between the pallet system and a material processing system, and a region between an upper and lower pallet.

20 Claims, 15 Drawing Sheets

(56) References Cited

U.S. PATENT DOCUMENTS

| | | | |
|---|---|---|---|
| 2003/0041770 A1* | 3/2003 | Peck | B23Q 7/1468 |
| | | | 105/29.1 |
| 2015/0136568 A1* | 5/2015 | Matsumoto | B65G 25/02 |
| | | | 198/710 |
| 2015/0178673 A1* | 6/2015 | Penneman | B61K 1/00 |
| | | | 104/18 |
| 2016/0039619 A1* | 2/2016 | Wargo | B66F 7/08 |
| | | | 414/640 |

* cited by examiner

PALLET SAFETY SYSTEM

TECHNICAL FIELD

Generally, the various embodiments disclosed herein relate to safety systems. Particularly, the various embodiments disclosed herein relate to safety systems for use with moveable pallet systems. More particularly, the various embodiments disclosed herein relate to a safety system that is configured to monitor an area proximate to one or more movable pallets, and/or an area within an interface opening of a material processing system through which the pallets move.

BACKGROUND

Pallet systems are utilized to move material into and out of a variety of material processing systems where a material is altered or modified in some manner, such as through cutting, machining and the like. For example, such material processing systems include, but are not limited to laser cutting machines, such as plasma, waterjet, or torch-type cutting devices, and the like; stamping machines, such as metal stamping machines and the like; and router devices, such as CNC (computer numeric controlled) routers and the like. One type of pallet system is referred to by reference numeral 10, as shown in FIGS. 1-8. The pallet system 10 is shown utilized with a material processing system 20, and for the purpose of the following discussion, the material processing system 20 comprises a laser cutter having a laser cutting head 25 that is moved and controlled by a gantry system 27.

The pallet system 10 includes a plurality of moving pallets 100A and 100B, each having a respective pallet bed 102A and 102B upon which material 550 to be processed is placed. The pallets 100A-B are moveably carried by rollers 120, or other suitable moving mechanism, with respect to a frame 200 that is contained within a housing 210. The frame 200 is supported by height adjustable legs 300, such as by hydraulic legs or the like. The frame 200 includes a pair of spaced upper tracks 400A, and a pair of spaced lower tracks 400B positioned beneath the upper tracks 400A, and are configured to be positioned at various vertical heights by the height adjusting legs 300. As such, the pallets 100A-B are configured to move horizontally on each of the tracks 400A-B by a suitable propulsion system (not shown). The vertical movement of the tracks 400A-B provided by the height adjusting legs 300 enables the tracks 400A and 400B to be selectively axially aligned with a pair of spaced interface tracks 500, which are provided by the material processing system 20. The interface tracks 500 are fixed in position, and do not move from their set vertical height. The pallet system 10 includes an open end 513, which allows the pallets 100A-B to enter and exit the pallet system 10.

The material processing system 20 includes an interface opening 510 through which the interface tracks 500 are provided. Thus, when the material processing system 20 and the pallet system 10 are placed in operational arrangement with one another the interface opening 510 of the material processing system 20 and the open end 513 of the pallet system 10 are abutted, directly adjacent to each other, or at least proximate to each other as shown in FIGS. 1-8. Next, the position of the tracks 400A-B of the pallet system 10 are selectively controlled to be placed in axial alignment with and abutted to, or placed proximate to, the interface tracks 500 of the material processing system 20 to allow the pallets 100A-B to move between the material processing system 20 and the pallet system 10 as necessary.

Thus, as a result of the placement of the material processing system 20 and the pallet system 10 with respect to each other, the interface opening 510 of the material processing system 20 and the open end 513 of the pallet system 10 are abutted, directly adjacent to each other, or at least proximate to each other as shown in FIGS. 1-8, and form a target area 800 within the interface opening 510 of the material processing system 20, which is between the tracks 500. In some embodiments, this target area 800 may be further defined by an area that is between an opening surface or edge 520, which at least partially defines the interface opening 510, and a base surface 530 that is substantially opposite to the opening surface or edge 520. It should be appreciated that the base surface 530 may be a floor surface upon which the material processing system 20 rests, or another surface, such as a surface provided by the material processing system 20. In other embodiments, the target area 800 may be further defined by an area that is between an outward facing header surface 540 that extends from the opening edge 520 of the material processing system 20 and a front edge 560 of one or more of the pallets 100A-B. In still other embodiments, the target area 800 may be further defined by an area that is between the outward facing header surface 540 and the open end 513 of the pallet system 10.

To move the pallets 100A-B horizontally in and out of the material processing system 20, through the interface opening 510 of the material processing system 20, and through the open end 513 of the pallet system 10 in a controlled manner during operation of the pallet system 10, the vertical height of the legs 300 and the horizontal movement of the pallets 100A-B, which are driven by a mechanical propulsion system, are controlled by a suitable controller (not shown). As such, the controller is configured to have the necessary hardware, software or combination thereof to control the movement of the pallets 100A-B.

During operation of the pallet system 10, as shown in FIGS. 3A-F, the topmost pallet 100A riding on track 400A is loaded with material 550 to be processed, such as by laser cutting, within the material processing system 20, as shown in FIG. 3A. In addition, the upper track 400A is configured to be vertically aligned with the interface track 500 of the material processing system 20. It should also be appreciated that the bottommost pallet 100B riding on the lower track 400B is positioned underneath the pallet 100A. Once the pallet 100A is loaded with material 550, pallet 100A is moved into the material processing system 20 via the interface track 500, where the material 550 is processed, as shown in FIG. 3B. While the pallet 100A is in the material processing system 20, the height adjusting legs 300 raise the frame 200 of the pallet system 10 upward, as shown in FIG. 3C. As such, the pallet 100B is now able to be loaded with material 550 that is to be processed by the material processing system 20. Next, as shown in FIG. 3D, the height adjusting legs 300 lower the frame 200 downward, so that the upper track 400A is aligned with the interface track 500 of the material processing system 20, whereupon the pallet 100A moved out of the material processing system 20 and onto the track 400A of the pallet system 10. Continuing, at FIG. 3E, the height adjusting legs 300 raise the frame 200 upward, so that the lower track 400B is now aligned with the interface track 500 of the material processing system 20, whereupon the pallet 100B is moved into the material processing system 20 so that the material 550 can be processed. Finally, as shown FIG. 3F, the height adjusting legs 300 lower the frame 200 downward so that material 550 to be processed can be removed from the pallet 100A.

Accordingly, this process, shown in FIGS. 3A-3F, is repeated as necessary by an operator who manually controls or oversees the systems 10 and 20 through a suitable control interface, and/or with an automated or partially-automated system implementing any suitable program or control, such as a CNC (computer numeric controlled) computer program. It should be appreciated that the process described above with regard to the operation of the pallet system 10 and the material processing system 20 is for illustrative purposes only, and that the pallet safety system discussed herein may be adapted for use with other pallet systems and material processing systems, which have different structural configurations (such as one or more pallets), as well as different operating sequences for controlling the movement of the pallets 100A-B.

As such, the movement of the pallets 100A-B through the target area 800 results in a safety hazard, as an obstacle, such as a person, body part thereof, animal, or other object may enter into the the target area 800, and as a result, injury or damage may be caused to the obstacle and/or to the pallet system 10 and/or the material processing system 20. For example, a person may enter the target area 800 through falling, which would cause injury due to the moving pallets 100A-B, which could be fatal.

Thus, there is a need for a pallet safety system that monitors a target area at an interface of a material processing system and a pallet system, through which one or more pallets move.

SUMMARY

In light of the foregoing, it is a first aspect of the various embodiments disclosed herein to provide a pallet monitoring system for a pallet system having one or more pallets for moving material into a processing system comprising an emitter adapted to be attached to the pallet system, the emitter configured to emit a first beam; and a first detector adapted to be attached to the pallet system, the first detector configured to receive the first beam, wherein the first beam is projected to form a plane over at least a portion of the one or more pallets.

It is another aspect of the various embodiments disclosed herein to provide a method of monitoring a pallet system having one or more pallets for moving material into a processing system comprising providing a first emitter; providing a first detector; projecting a first beam from the first emitter to the first detector across a plane over at least a portion of the one or more pallets; and detecting whether the first projected beam has been interrupted.

It is yet another aspect of the various embodiments disclosed herein to provide a method of monitoring a pallet system having one or more pallets for moving material into a material processing system comprising placing the pallet system adjacent to a processing system to form an interface through which the one or more pallets move, the material processing system including an area adjacent to the interface; providing an emitter; providing a detector; projecting a beam from the emitter to the detector to detect the presence of an object in the area; and determining whether the first projected beam has been interrupted by the object.

BRIEF DESCRIPTION OF THE DRAWINGS

These and other features and advantages of the various embodiments disclosed herein will become better understood with regard to the following description, appended claims, and accompanying drawings, wherein:

DETAILED DESCRIPTION

Figure 1:
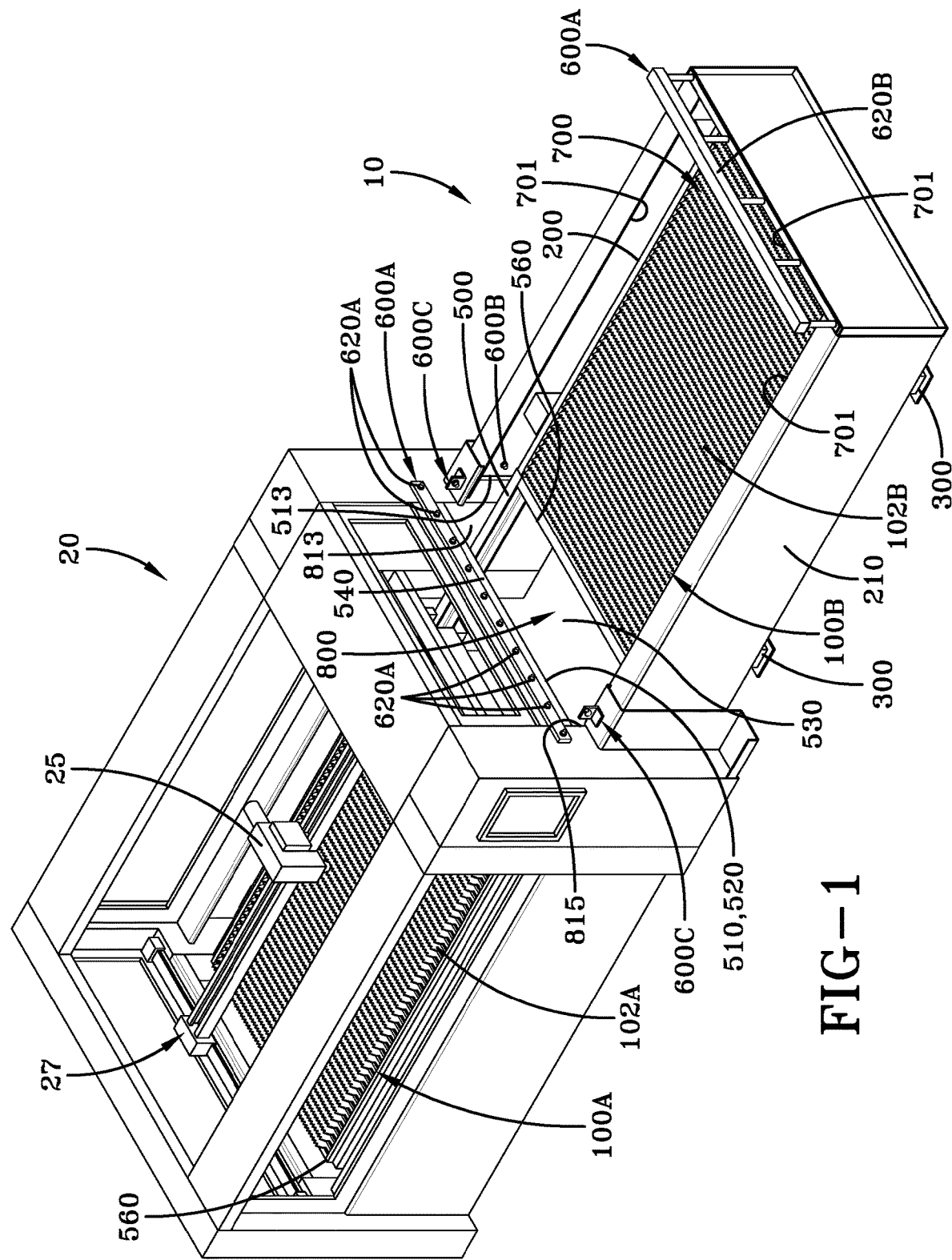
FIG. 1 is a perspective view of a pallet system and a material processing system that includes a pallet safety system in accordance with the various embodiments disclosed herein.
Figure 2:
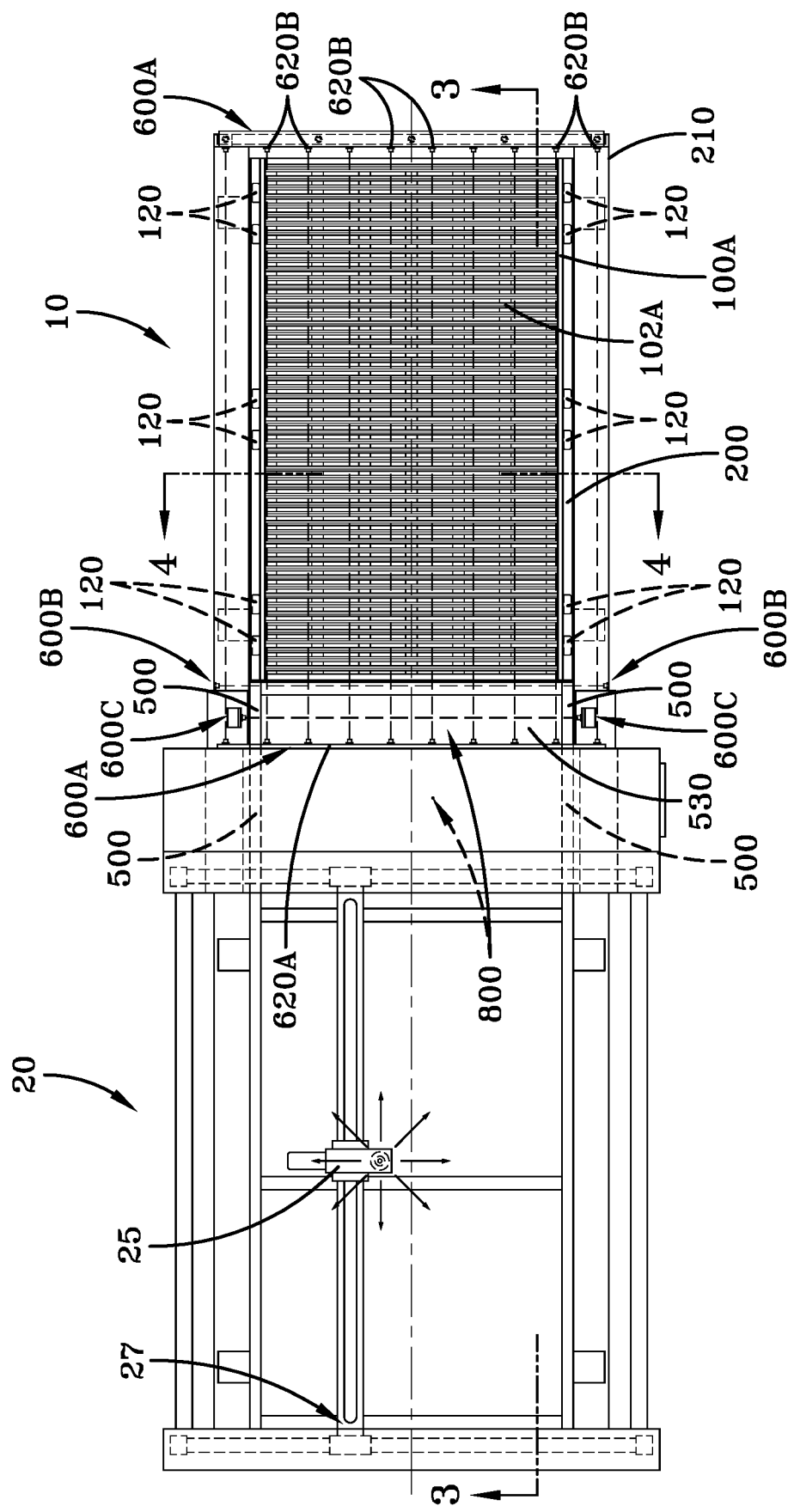
FIG. 2 is a top plan view of the pallet system and material processing system utilizing the pallet safety system in accordance with the various embodiments disclosed herein.
Figure 3A:
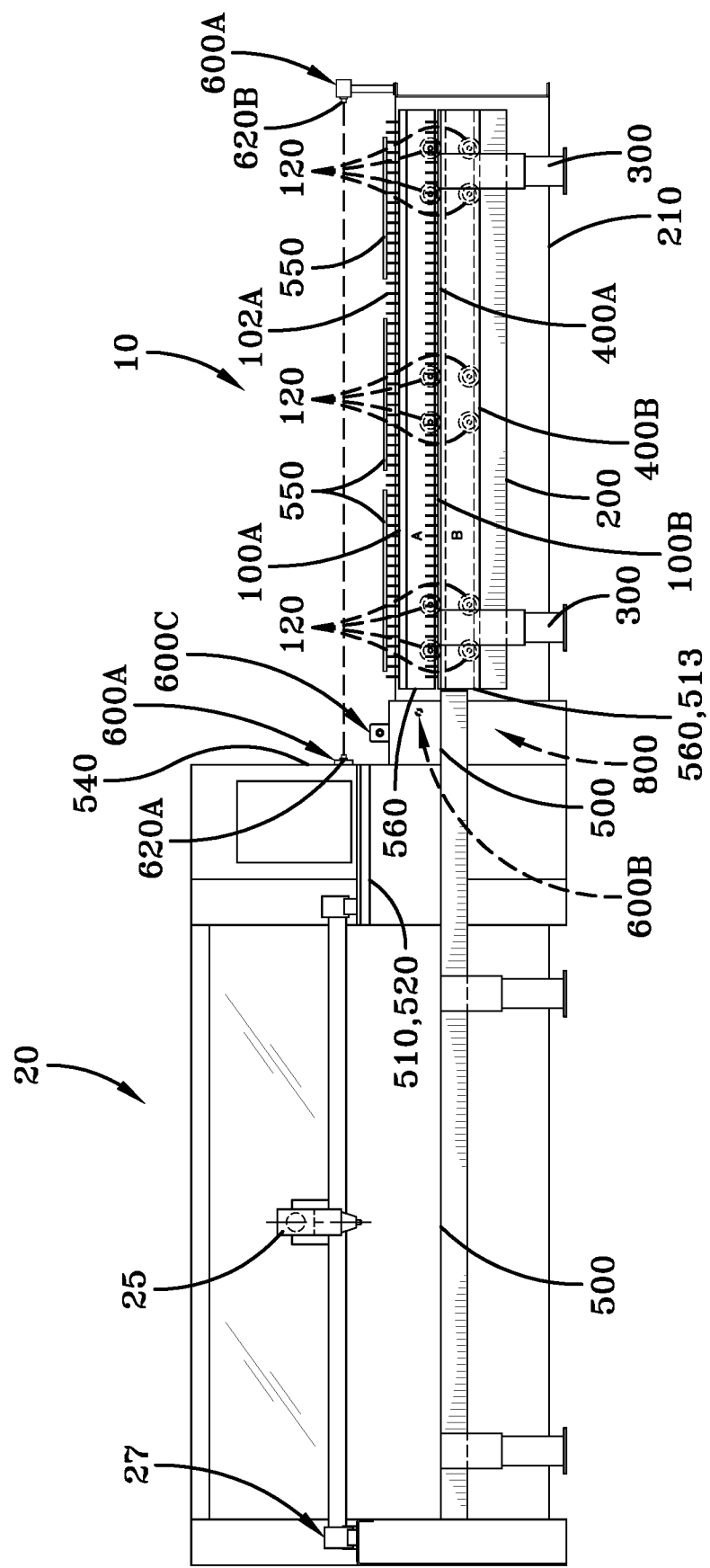
FIGS. 3A-F are elevational views of the showing the various pallets of the pallet system in accordance with the various embodiments disclosed herein.
Figure 3B:
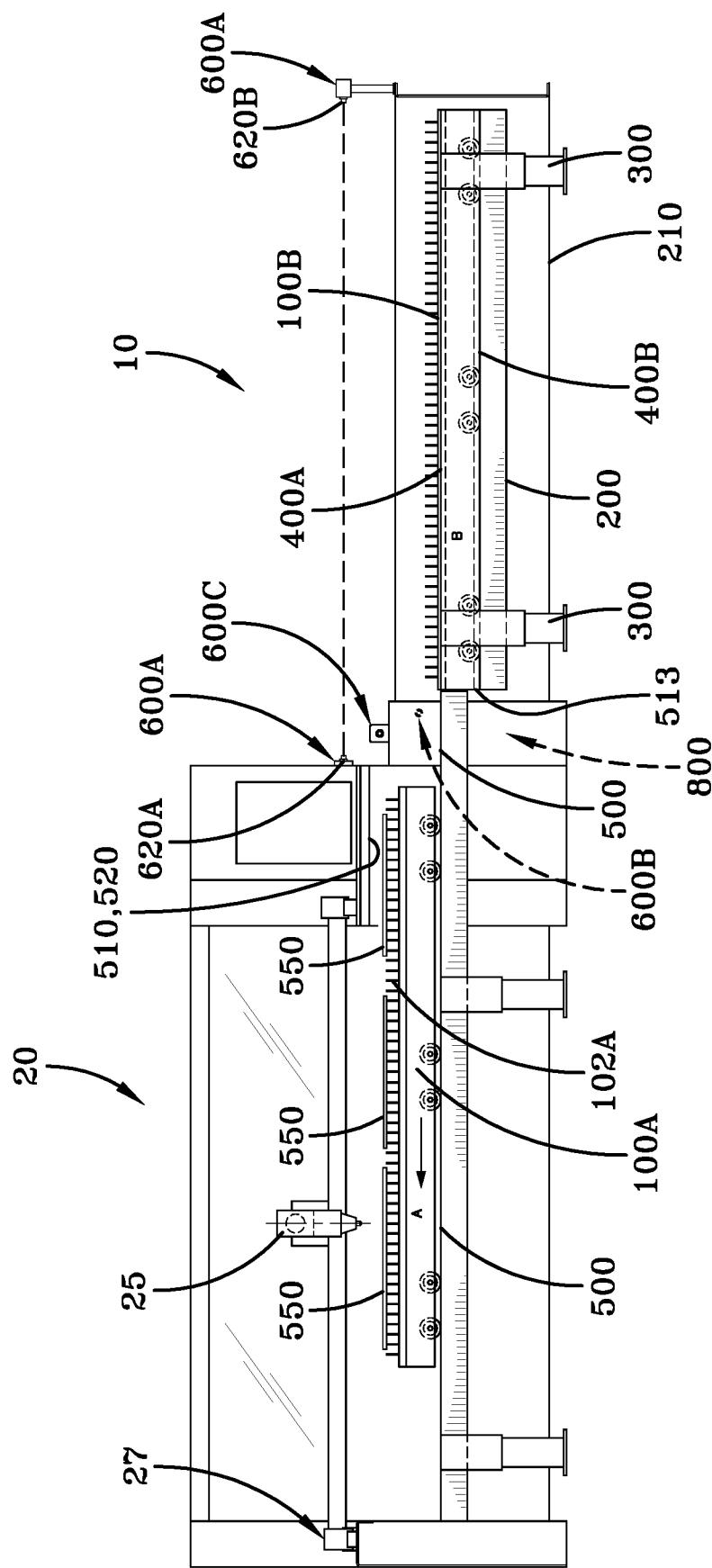
Figure 3C:
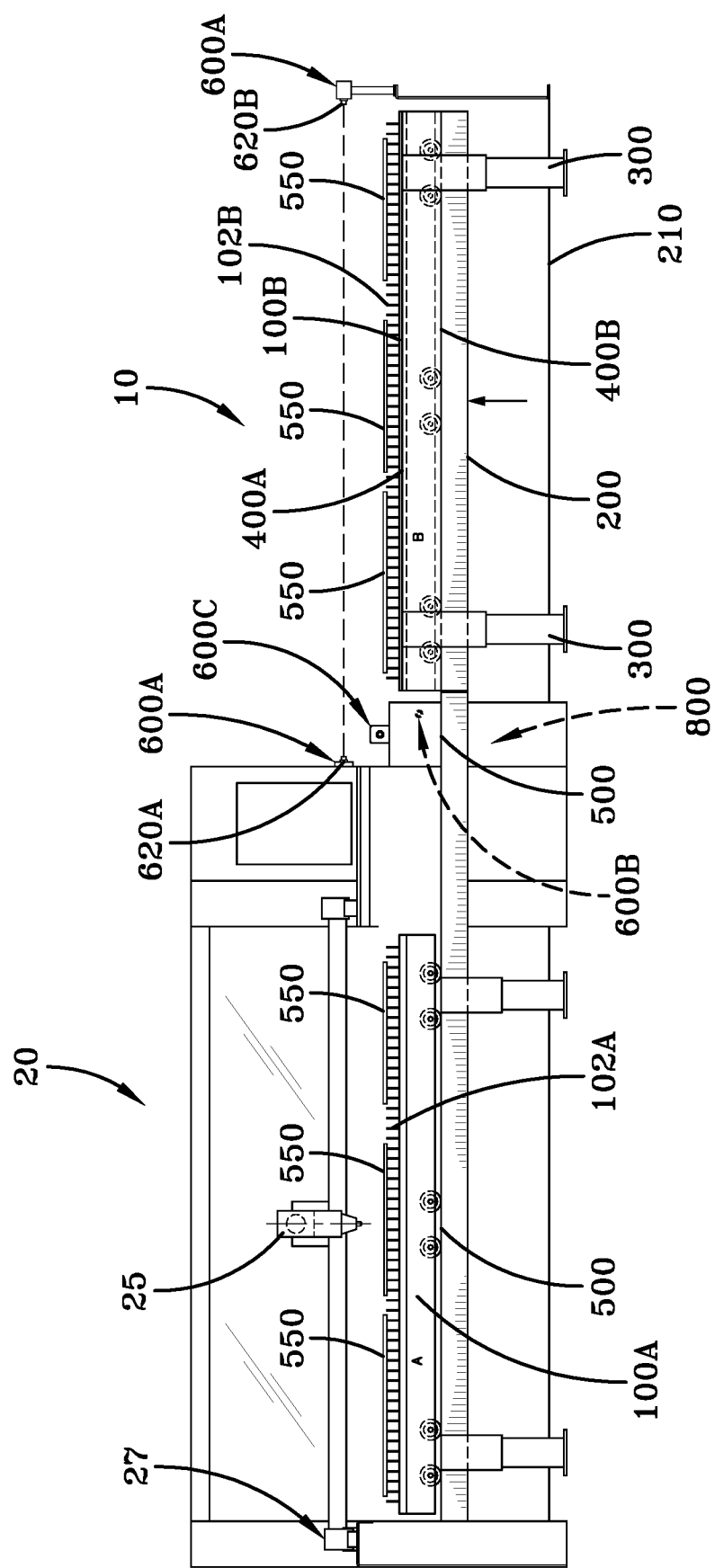
Figure 3D:
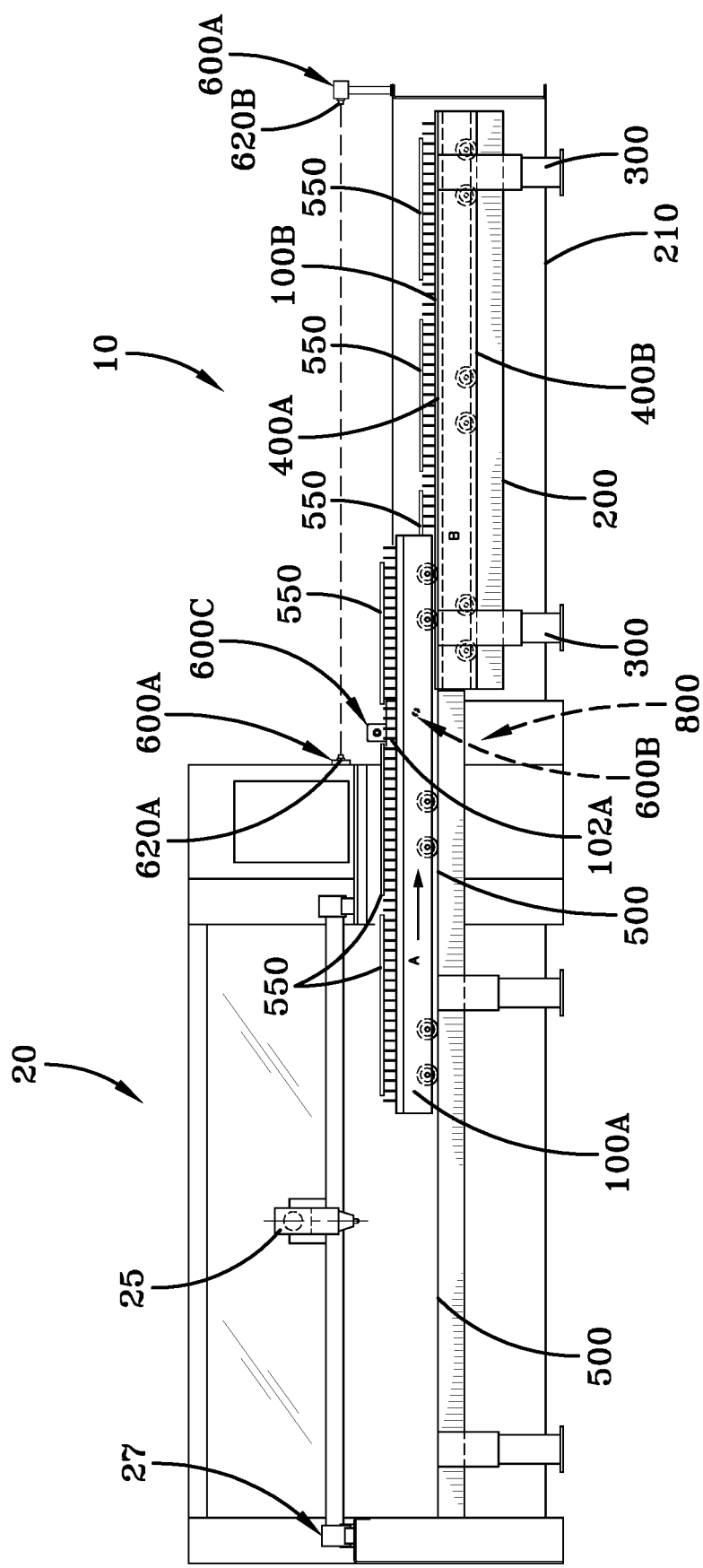
Figure 3E:
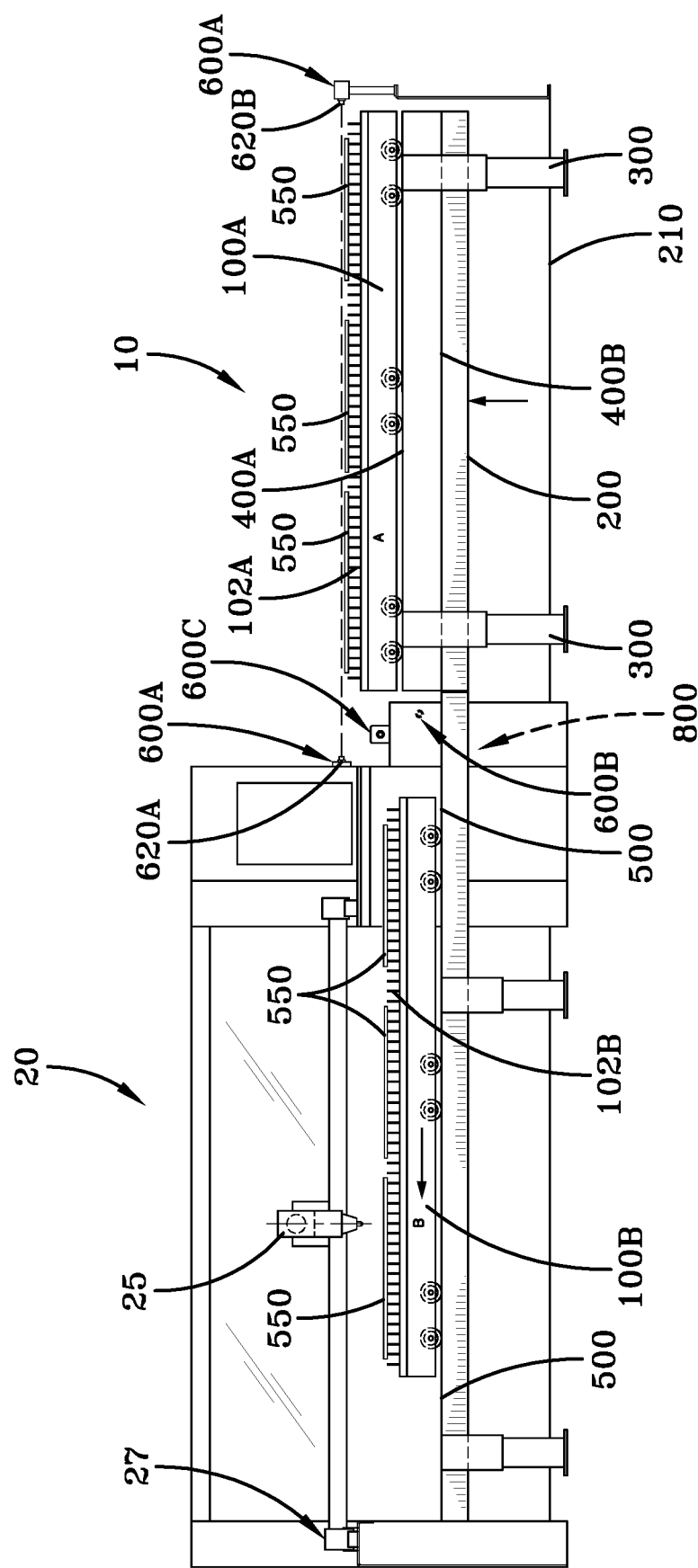
Figure 3F:
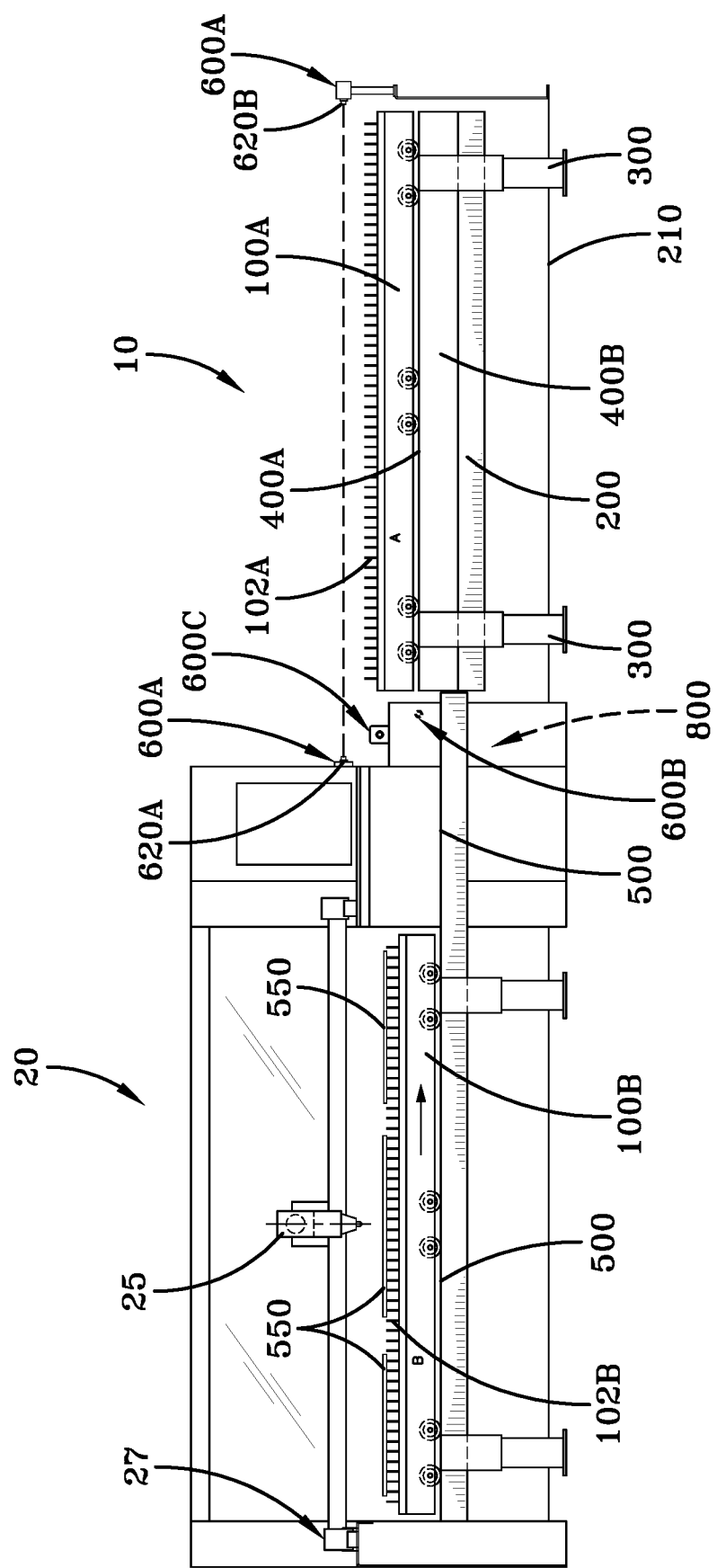

A pallet safety system includes systems 600A-C, as shown in FIGS. 1-9. The systems 600A-C are configured to be utilized with a pallet system, such as pallet system 10 that was previously discussed for use with the material processing system 20 also previously discussed, which may be configured as a laser cutter, but is not required. Furthermore, it should be appreciated that the safety system may be used with any suitable pallet system 10 having one or more pallets and any suitable material processing system 20.

The pallet safety system includes one or more of a pallet bed monitoring system 600A, a pallet height monitoring system 600B, and an interface monitoring system 600C as desired. Each of the pallet bed monitoring system 600A, the pallet height monitoring system 600B, and the interface monitoring system 600C utilize an emitter and a detector. The emitter and detector may utilize any suitable communication medium, such as that provided by light, such as infrared (IR) light, laser light, sound, such as sonic or ultrasonic sound waves, or radio frequency (RF) waves for example to form beams or waves that are communicated from the emitter to the detector. However, for the purpose of the following discussion, the emitter and the detector comprise a light or optical based emitter and detector, such as those which use a laser light for example.

The pallet bed monitoring system 600A, the pallet height monitoring system 600B, and the interface monitoring system 600C are configured so that they can be retrofit to the pallet system 10 and/or the material processing system 20. However, in other embodiments, they may be made integral with the pallet system 10 and/or material processing system 20 using known techniques. In addition, the pallet bed monitoring system 600A includes an emitter 620A and a detector 620B; the pallet height monitoring system 600B includes an emitter 630A and a detector 630B; and the pallet interface monitoring system 600C includes an emitter 640A and a detector 640B. It should be appreciated that the monitoring systems 600A, 600B and 600C may each utilize one or more emitters and one or more more detectors as necessary to achieve the desired area or zone of detection. It should also be appreciated that the position of the emitters and the detectors described herein may be reversed as necessary, and that the position described herein should not be construed as limiting. Furthermore, the emitters and detectors discussed with regard to the various monitoring systems 600A-C may be retrofit/attached or made integral with one or more of the pallet system 10 and/or the material processing system 20. Alternatively, the systems 600A-C may be provided on stands and positioned to achieve the desired obstacle monitoring disclosed herein.

Each of the monitoring systems 600A-C are coupled by a wired or wireless communication interface to a suitable computing unit or controller having the necessary hardware, software or combination thereof to carry out the various monitoring functions to be discussed. In some embodiments, the computing unit may comprise the control unit provided by the material processing system 20, the pallet system 10 or a combination thereof. It should be appreciated that the computing unit may be provided locally or remotely to the systems 600A-C, such as via a wireless "cloud" computing system or other remote computing system. The computing system may be configured to generate a suitable audible and/or visual alert in the case where one or more of the pallet bed monitoring system 600A, the pallet height monitoring system 600B, and the interface monitoring system 600C detect an obstruction which breaks one or more of the beams communicated between the emitter and detector. It should be appreciated that the alert may be communicated locally or remotely via any suitable wired or wireless communication network to any suitable computing device, such as a desktop/mobile computing device, such as a smartphone, or the like.

As such, the pallet bed monitoring system 600A is configured to monitor a pallet bed opening 700 for obstructions. It should be appreciated that the pallet bed opening 700 is an opening bounded by edges 701 of the housing 210 of the pallet system 20, exposing the pallet beds 102A-B of each of the pallets 100A-B, respectively to the environment. Accordingly, the pallet bed opening 700 provides an opening in the housing 210 of the pallet system 10, through which the material 550 may be placed upon or removed from the various pallets 100A-B. The pallet bed monitoring system 600A is configured so that the emitter 620A is positioned proximate to one end of the pallet bed opening 700, such as to the header surface 540 near the interface opening 510 of the material processing system 20 or the open end 513 of the pallet system 10. In addition, the detector 620B is positioned proximate to the other end of the pallet bed opening 700, which is opposite the interface opening 510 of the material processing system 20 or the open end 513 of the pallet system 10. The emitter 620A and the detector 620B (as well as any emitter or detector disclosed herein) may be mounted to either of the the material processing system 20 or the pallet system 10 using any suitable technique, such as bolts, nuts, screws, rivets, adhesives, such as adhesive tape, and the like. The emitter 620A and the detector 620B generate one or more individual light beams or a light beam formed as a sheet which is parallel or substantially parallel to the pallet bed opening 700 or portion thereof. That is, the light beams may be emitted at any suitable height relative to the pallet bed opening 700. It should be appreciated that the emitter 620A and the detector 620B may be positioned anywhere relative to the pallet bed opening 700, so that one or more beams of light extend over the pallet bed opening 700 to detect obstructions entering therein. In some embodiments, multiple beams or a single divergent beam of light may be used by the system 600A.

Figure 4:
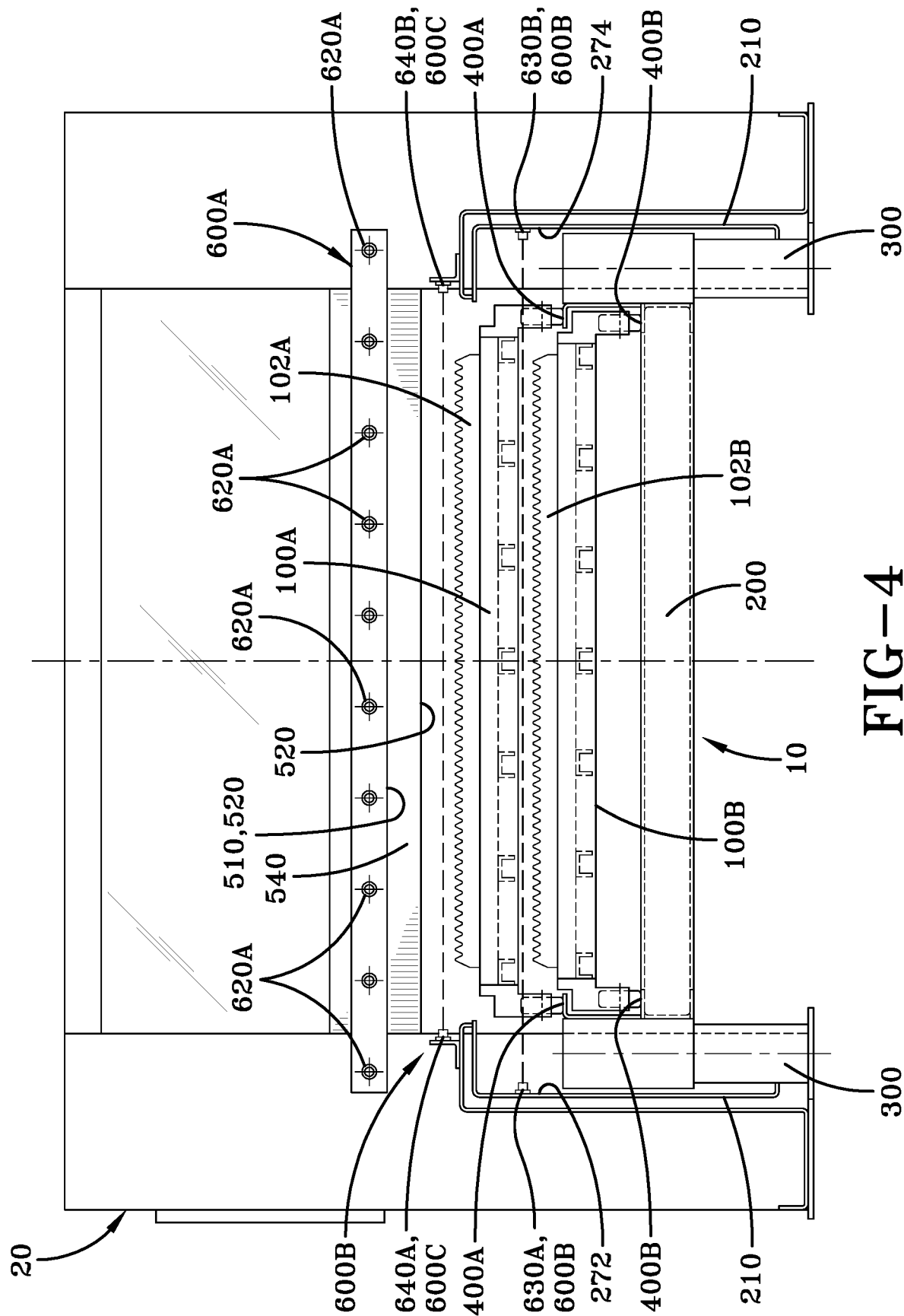
FIG. 4 is an end view of the pallet system including the pallet safety system in accordance with the various embodiments disclosed herein.
Figure 5A:
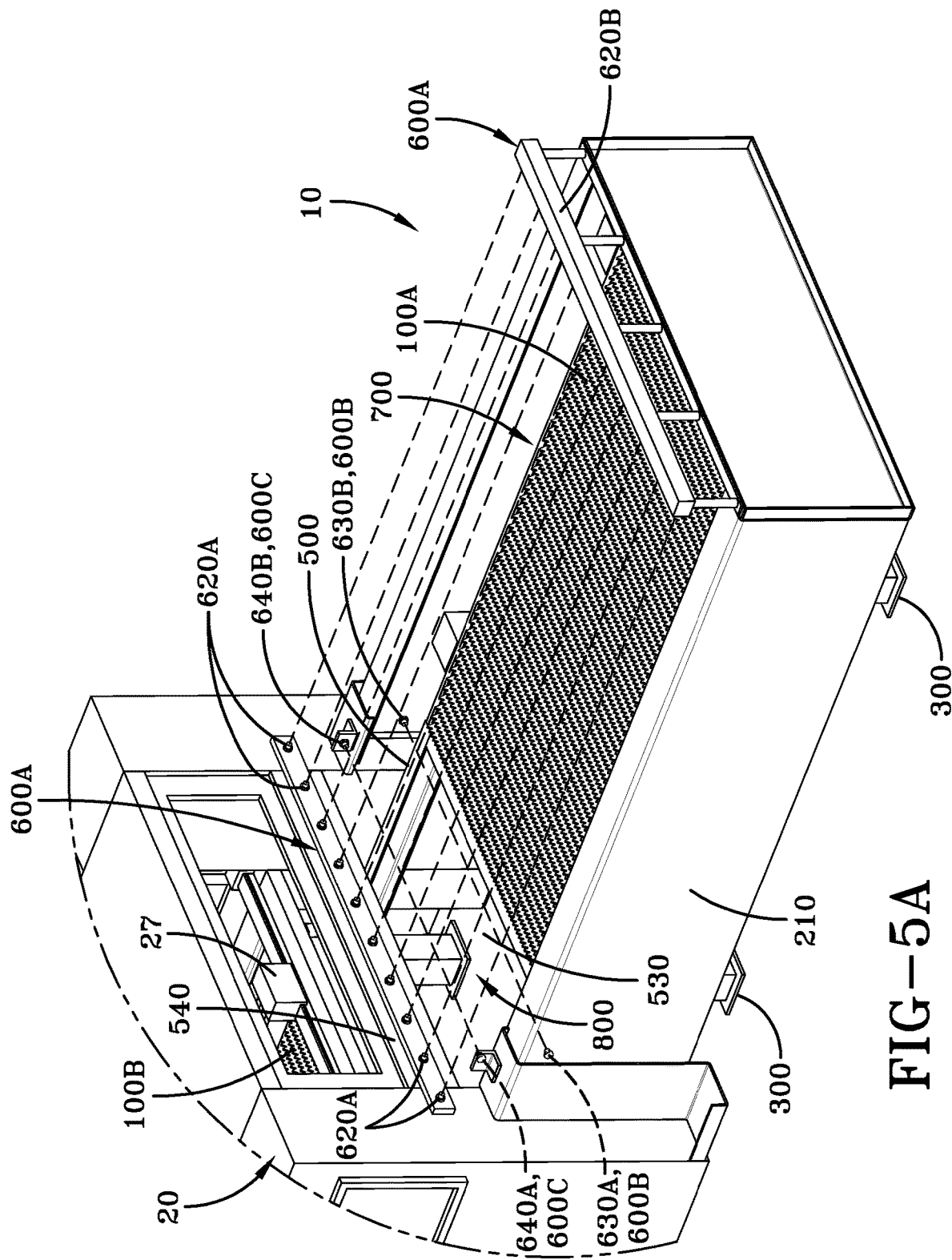
FIGS. 5A-B are perspective views showing the pallet system and material processing system with the pallets being moved to various positions in accordance with the various embodiments disclosed herein.
Figure 5B:
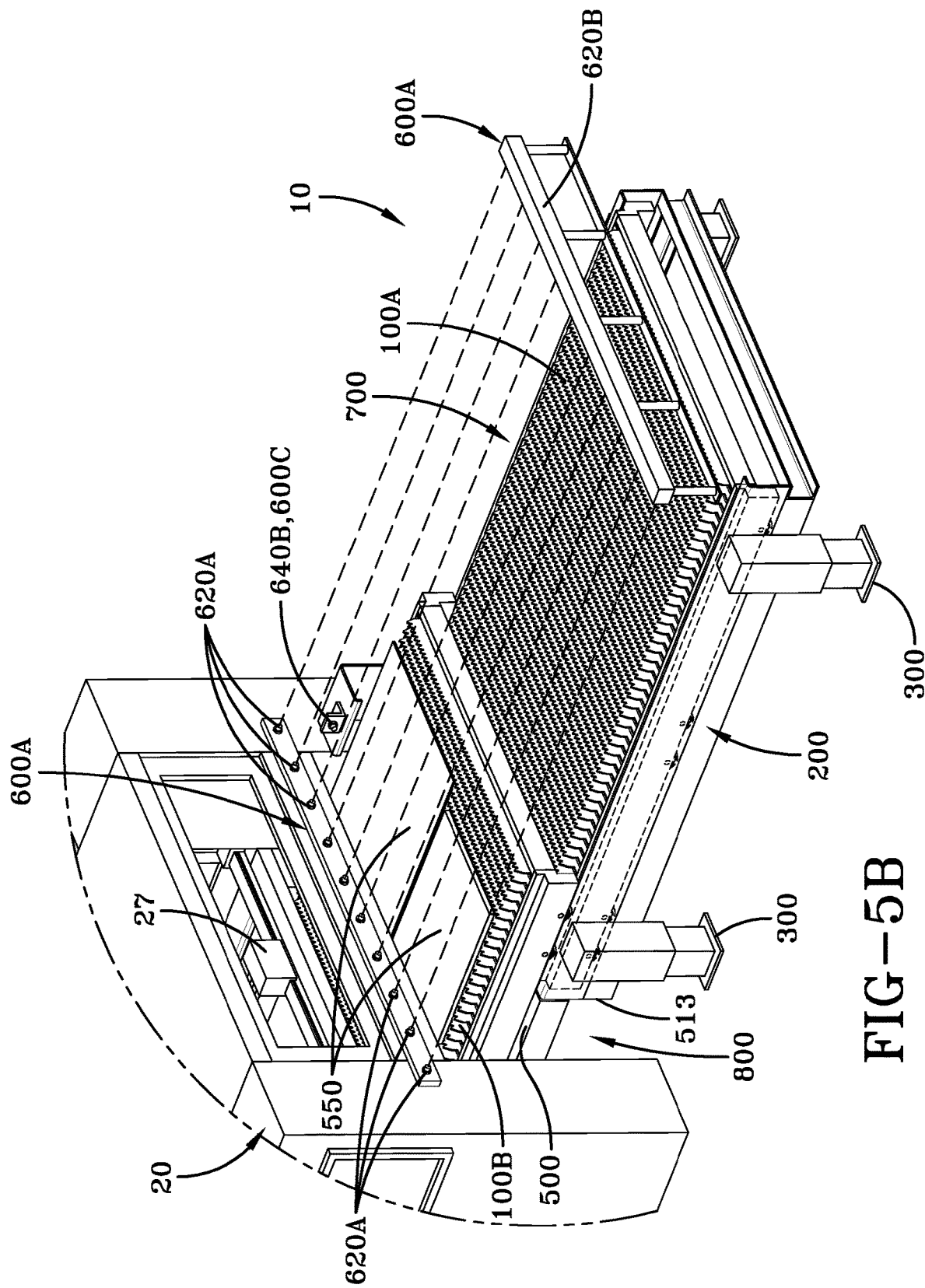
Figure 6:
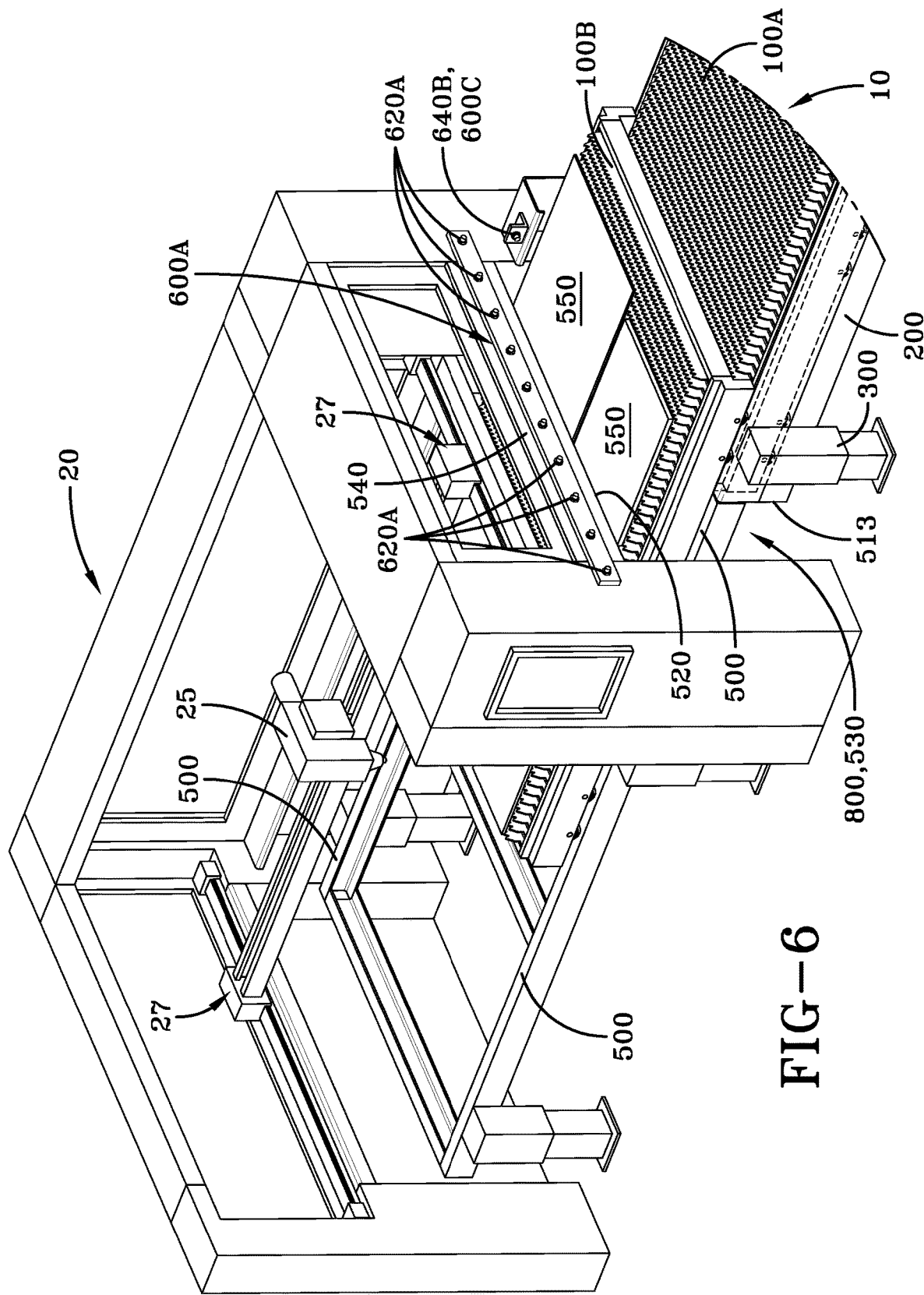
FIG. 6 is a perspective view showing the pallet system and material processing system utilizing the pallet safety system with one pallet being positioned within the material processing system in accordance with the various embodiments disclosed herein.
Figure 7:
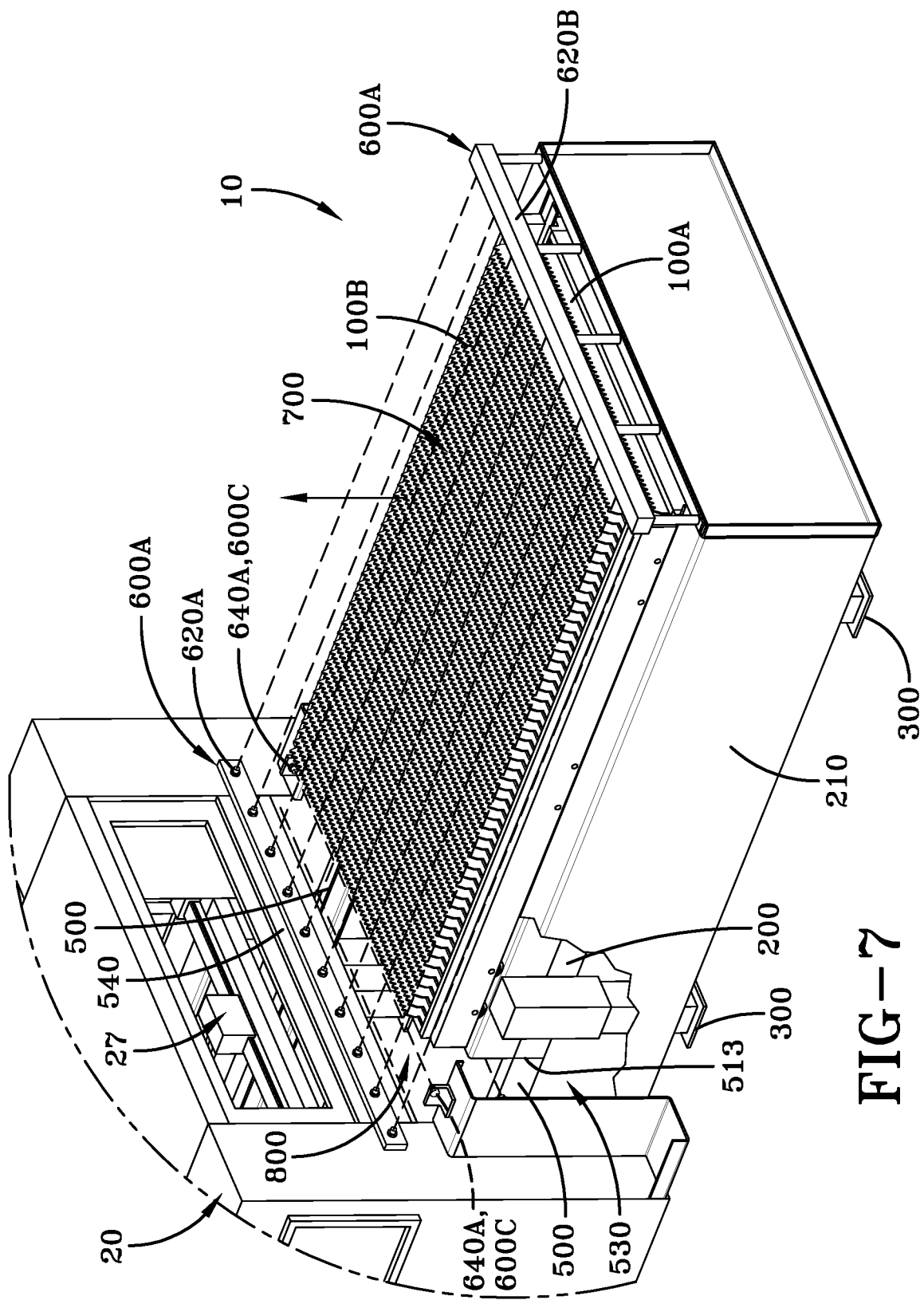
FIG. 7 is a perspective view showing the pallet system and material processing system utilizing the pallet safety system in accordance with the various embodiments disclosed herein.
Figure 8:
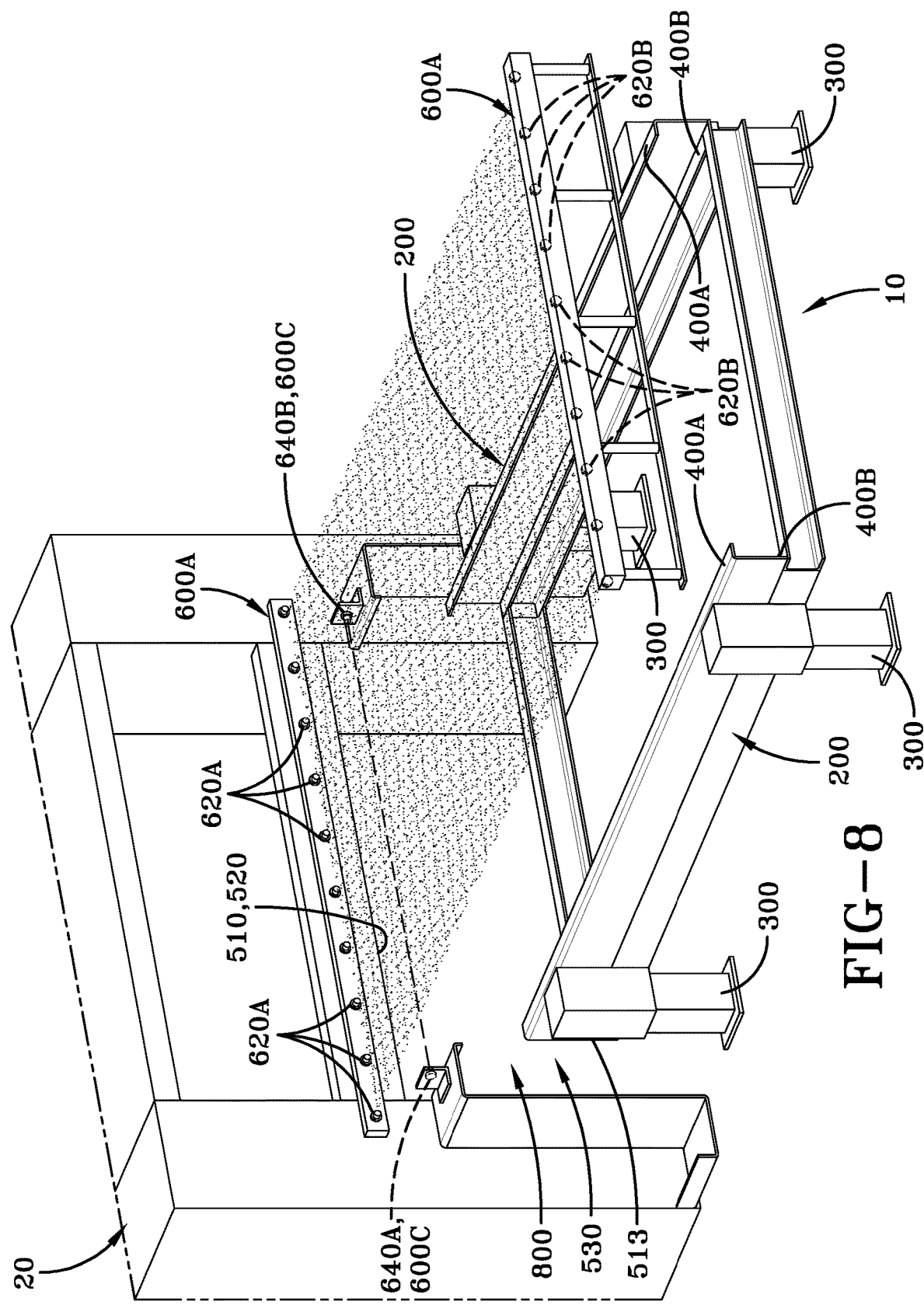
FIG. 8 is a perspective view of the pallet system and the pallet safety system with the pallets removed in accordance with the various embodiments disclosed herein.

The pallet height monitoring system 600B, as shown clearest in FIGS. 4 and 8, includes the emitter 630A and the detector 630B, which are positioned on opposed inner surfaces 272 and 274 of the pallet system housing 210, such that the light beam that extends from the emitter 630A to the detector 630B is substantially perpendicular to the horizontal movement of the pallets 100A-C. Furthermore, the emitter 630A and the detector 630B are positioned so that the light beam that is communicated therebetween extends above the pallet bed 102B to detect material 550 or other protruding objects that may extend from the lower pallet bed 102B of pallet 100B, which may collide or impact the bottom of the upper pallet 100A, as the pallets are moved horizontally. In addition, as shown in FIG. 5A, the monitoring system 600B is also positioned, so that the light beam communicated between the emitter 630A and the detector 630B extends proximate to, or in some embodiments extends through, the target area 800 or portion thereof previously discussed. Alternatively, the emitter and detector 630A-B of the pallet height monitoring system 600B may be configured to be attached to the opposed inner walls defining the interface opening 510 of the material processing system 20 at the same vertical position discussed when the emitter and the detector 630A-B are attached to the pallet system housing 210 previously discussed. It should be appreciated that in other embodiments, the emitter and detector 630A-B are attached to skirts 712 that are positioned proximate to opposite walls of the housing 210 of the pallet system 10.

With regard to the pallet interface monitoring system 600C, as shown in the FIGS., and particularly in FIGS. 4-8, the emitter 640A and the detector 640B are attached to opposed side walls of the of the pallet system housing 210 and are positioned above the pallet bed opening 700, such that the light beam communicated by the emitter and detector 640A-B is proximate to, or extends through, the target area 800 previously discussed. In some embodiments, the light beam is further positioned above the maximum vertical height of pallet 100A. Alternatively, the emitter 640A and the detector 640B may be attached to opposed side walls proximate to the interface opening 510 of the of the material processing system 20.

Thus, during operation of one or more of the operating systems 600A, 600B and 600C, when a break in the light beam is detected by the appropriate detector 620B, 630B or 640B, which is caused by an obstacle, such as a person, body part, or other object, the computing system or controller (not shown), which is coupled to the systems 600A-C, takes one or more actions, including but not limited to: stopping the vertical and/or horizontal movement of one or more of the pallets 100A-B, issuing an audible and/or visual alert, and communicating the alert through a wired or wireless network to a local or remote standalone or portable computing device, such as a smart phone. Moreover, the alert may include an emergency stop or an alarm that is displayed on either a separate display or a display that is directly provided or interfaced with the material processing system 20 and/or pallet system 10. In some embodiments, the operation of the pallet system 10 is stopped automatically if the pallet safety system detects the presence of an unwanted object, such as a person, or other obstruction. In other embodiments, the pallet changing process discussed with regard to FIGS. 3A-F can either be denied prior to operation or stopped during operation if a beam associated with one or more of the systems 600A-C is tripped or broken. It should also be appreciated that one or more of the the systems 600A-C may be either left "ON" so that they are operational at all times, or may be made operational only when the pallets 100A-B are controlled to actually move.

Figure 9:
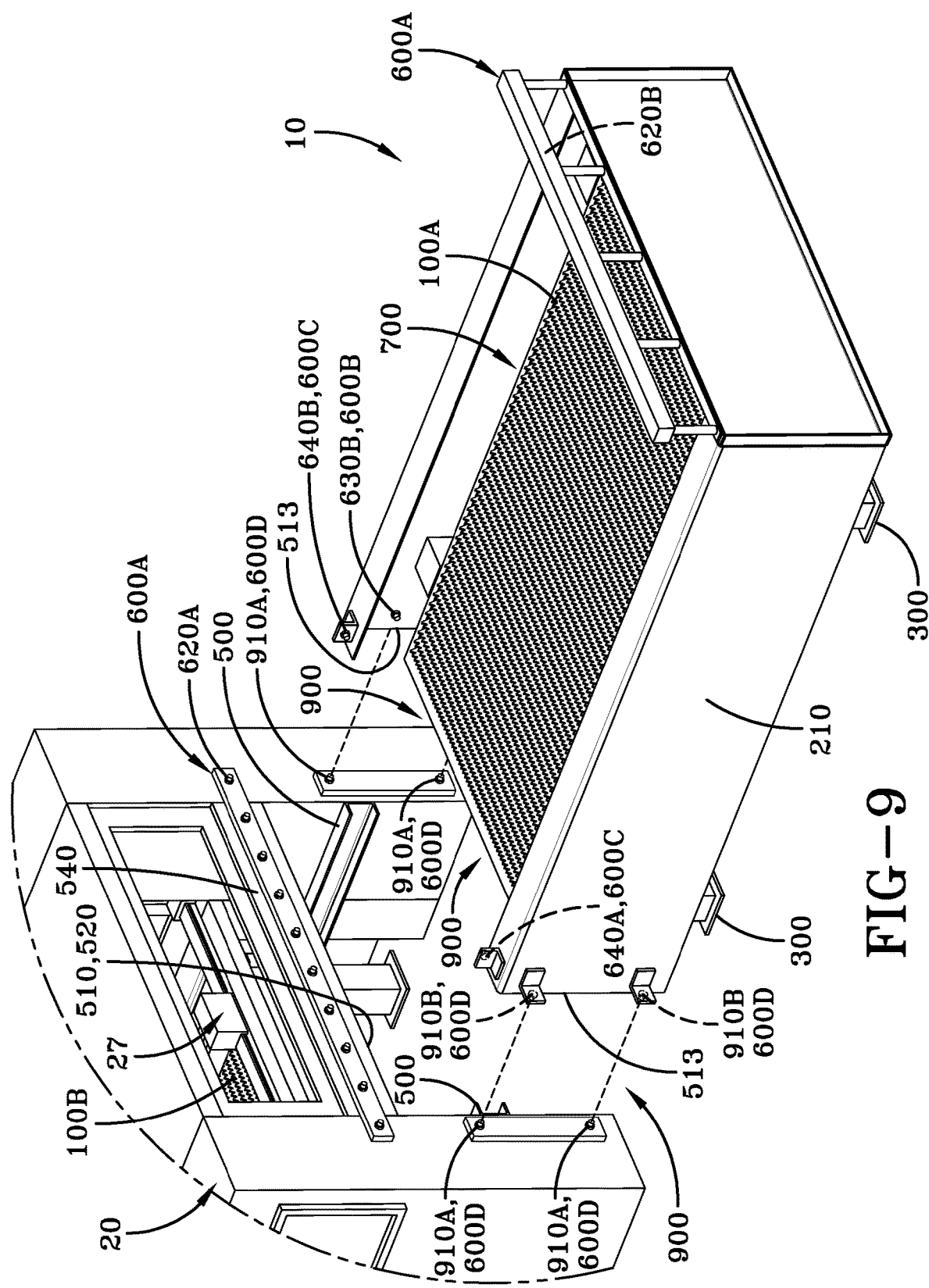
FIG. 9 is a perspective view of an alternative arrangement of the pallet system and material processing system utilizing the pallet safety system.

In yet another embodiment, as shown in FIG. 9, the interface opening 510 of the material processing system 20 and the open end 513 of the pallet system system 10 are spaced apart from each other, so as to form a gap 900 therebetween. Accordingly, during operation, the one or more pallets 100A-B move across the gap 900 between the material processing system 20 and the pallet system 10. The gap 900 may be of any desired width, but in some configurations, the gap 900 may be wide enough to allow a body part, or portion thereof, such as a hand, arm, or the like to extend thereinto. In some embodiments, the gap 900 may may be wide enough for a person to walk through. However, the gap 900 may allow any object to be received therein to serve as an obstruction to the movement of the one or more pallets 100A-B. To monitor the presence of obstructions within the gap 900, such as a person or portion thereof, the pallet safety system may include the gap monitoring system 600D. The gap monitoring system 600D includes one or more sets of an emitter 910A and a detector 910B. The emitter 910A and the detector 910B may be positioned anywhere relative to the gap 900 to detect the presence of an obstacle entering into the gap 900. In some embodiments, the emitter 910A is attached proximate to the interface opening 510 of the material processing system 20, and the detector 910B is attached proximate to the open end 513 of the the pallet system housing 210. One set of emitter/detectors may be placed at each end of the gap 900, or may be placed at only one end of the gap 900 as desired. Multiple sets of emitter and detector 910A-B may also be vertically arranged at different heights, as shown in FIG. 9. During operation, a detection beam extends between each pair of emitters/detectors 910A/910B to monitor the presence of an obstruction entering into the gap 900. It should be appreciated that the gap monitoring system 600D is configured to be coupled to the computing system or controller previously discussed for use the the other systems 600A-C. Furthermore, the system 600D is configured to operate to detect obstacles in a manner that is equivalent to the other systems 600A-C previously discussed.

The emitter and detector 910A-B may utilize any suitable communication medium, including those previously discussed, such as that provided by light, including infrared (IR) light, laser light, sound, such as sonic or ultrasonic sound waves, or radio frequency (RF) waves for example to form beams that are communicated from the emitter to the detector. However, as previously discussed, the emitter and the detector comprise a light or optical based emitter and detector.

It should also be appreciated that one or more of the emitters/detectors of each of the monitoring systems 600A-D may be provided as standalone systems, and the emitters/detectors thereof may be provided mounts or stands that are not attached to the pallet system 10 or the material processing system 20.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. A pallet monitoring system for a pallet system having a housing in which a plurality of pallets each has a pallet bed with a horizontally extending face to carry objects placed thereon, the housing including a first track and a second track positioned above the first track, with at least one of the plurality of pallets being movably carried on each track into and out of a processing system, the housing having an opening in which the horizontally extending faces of the pallet beds are selectively exposed therethrough, the pallet monitoring system comprising:
a first emitter adapted to be positioned proximate to the opening of the housing, said emitter configured to emit a first beam that extends above the opening and in a direction parallel to the movement of the pallets; and
a first detector adapted to be positioned proximate to the opening, said first detector configured to receive said first beam.

2. The pallet monitoring system of claim 1, wherein said first beam is selected from the group consisting of: light, radio, or sonic beams.

3. The pallet monitoring system of claim 1, wherein said first beam is a plurality of beams that form a plane.

4. The pallet monitoring system of claim 1, further comprising:
a second emitter adapted to be attached proximate to an interface of the pallet system through which the plurality of pallets move, said second emitter configured to be operatively coupled to the processing system, said second emitter configured to emit a second beam; and
a second detector configured to receive said second beam;
wherein said second beam is configured to project across the interface.

5. The pallet monitoring system of claim 4, wherein said second beam is selected from the group consisting of: light, radio, or sonic beams.

6. The pallet monitoring system of claim 4, further comprising:
a third emitter adapted to be attached inside the housing and proximate to an interface of the pallet system configured to be operatively coupled to a processing system said third emitter configured to emit a third beam; and
a third detector configured to receive said second beam;
wherein said second beam is configured to project above a first pallet when said pallet is moved into the processing system, and
wherein said third beam is configured to project above a second pallet when said pallet is moved into the processing system, wherein the second pallet is initially positioned beneath said first pallet.

7. The pallet monitoring system of claim 6, wherein said third emitter is positioned to emit said third beam between a pair of the plurality of pallets.

8. The pallet monitoring system of claim 1, wherein the horizontally extending faces of the pallet beds are parallel to a plane formed by the opening of the housing.

9. The pallet monitoring system of claim 1, wherein said first emitter and said first detector are positioned above the opening of the housing.

10. A method of monitoring a pallet system having a housing in which a plurality of pallets each has a pallet bed with a horizontally extending face to carry objects placed thereon, the housing including a first track and a second track positioned above the first track, with at least one of the plurality of pallets being movably carried on each track into and out of a processing system, the housing having an opening in which the horizontally extending faces of the pallet beds are selectively exposed therethrough, the method comprising:

providing a first emitter proximate to the opening of the housing;

providing a first detector proximate to the opening of the housing;

projecting a first beam from said first emitter to said first detector, wherein said first beam extends above and in a direction that is parallel to the movement of the pallets; and detecting whether said first projected beam has been interrupted.

11. The method of claim 10, wherein said first beam is selected from the group consisting of: light, radio, or sonic beams.

12. The method of claim 10, further comprising:

providing a second emitter;

providing a second detector;

projecting a second beam from said second emitter to said second detector across an interface of the pallet system that is in operative communication with a processing system; and detecting whether said second projected beam has been interrupted.

13. The method of claim 12, wherein said first beam is selected from the group consisting of: light, radio, or sonic beams.

14. The method of claim 12, further comprising:

providing a third emitter inside the housing;

providing a third detector;

projecting a third beam from said third emitter to said third detector across said interface of the pallet system that is in operative communication with a processing system, wherein said second beam and said third beams are at different heights; and detecting whether one or more of said second or third projected beam has been interrupted.

15. The method of claim 10, wherein the horizontally extending faces of the pallet beds are parallel to a plane formed by the opening of the housing.

16. A method of monitoring a pallet system having a plurality of pallets having pallet beds for moving material thereon into a material processing system comprising:

placing a housing of the pallet system adjacent to a processing system to form an interface through which the one or more pallets move on respective stacked rails, which are attached to the housing, the housing including a horizontally extending opening in which the pallet beds are selectively exposed therethrough as they move into and out of the processing system;

providing a first emitter;

providing a first detector;

projecting a first beam from said first emitter to said first detector, wherein said first beam extends above the opening and in a direction that is parallel to the movement of the pallets;

determining whether said first projected beam has been interrupted by the object;

providing a second emitter inside said housing;

providing a second detector inside said housing;

projecting a second beam between a pair of the plurality of pallets to detect the presence of an object between said pair of pallets; and determining whether said second projected beam has been interrupted by the object between said pair of pallets.

17. The method of claim 16, wherein said first emitter and said first detector are positioned above the opening of the housing.

18. The method of claim 16, wherein said first beam is a plurality of beams that form a plane that is parallel to the opening of the housing.

19. The method of claim 16, wherein the pallet system and the material processing system are directly adjacent to each other.

20. The method of claim 16, wherein a horizontally extending face of the pallet beds are parallel to the horizontally extending opening.

* * * * *